US007258636B2

(12) United States Patent
Reuschel

(10) Patent No.: US 7,258,636 B2
(45) Date of Patent: Aug. 21, 2007

(54) METHOD AND APPARATUS FOR PERFORMING A SLIPPAGE REGULATION IN A CONTINUOUSLY VARIABLE TRANSMISSION

(75) Inventor: Michael Reuschel, Ottersweier (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 47 days.

(21) Appl. No.: 11/070,928

(22) Filed: Mar. 3, 2005

(65) Prior Publication Data
US 2005/0197220 A1  Sep. 8, 2005

Related U.S. Application Data

(63) Continuation of application No. PCT/DE03/02913, filed on Sep. 3, 2003.

(30) Foreign Application Priority Data
Sep. 4, 2002 (DE) .................. 102 40 841

(51) Int. Cl.
F16H 61/06 (2006.01)
F16H 59/04 (2006.01)
F16H 61/662 (2006.01)

(52) U.S. Cl. ..................... 474/12; 474/17; 474/28; 477/46

(58) Field of Classification Search ............... 474/12, 474/18, 28, 46, 69–70; 477/31, 39, 45–50; 701/51, 54–56
See application file for complete search history.

(56) References Cited

U.S. PATENT DOCUMENTS

| 5,707,314 | A  | * | 1/1998 | Kashiwabara et al. ....... 477/45 |
| 5,888,168 | A  | * | 3/1999 | Niiyama et al. ............. 477/49 |
| 6,099,424 | A  | * | 8/2000 | Tsai et al. ................... 474/18 |
| 6,524,210 | B1 | * | 2/2003 | Vorndran .................... 474/28 |
| 6,547,692 | B1 | * | 4/2003 | Ries-Mueller et al. ....... 477/45 |
| 6,597,977 | B1 | * | 7/2003 | Danz et al. .................. 477/31 |
| 6,612,949 | B2 | * | 9/2003 | Pelders et al. ............... 477/46 |
| 6,677,685 | B2 | * | 1/2004 | Pfleger et al. .............. 180/338 |

FOREIGN PATENT DOCUMENTS

| EP | 0 760 441 A1 | 3/1997 |
| EP | 0760441 A2 * | 3/1997 |
| EP | 1 158 216 A1 | 11/2001 |
| EP | 1158216 A2 * | 11/2001 |
| EP | 1167839 A1 * | 1/2002 |
| WO | WO 01/20198 A1 * | 3/2001 |

* cited by examiner

Primary Examiner—Marcus Charles
(74) Attorney, Agent, or Firm—Alfred J. Mangels

(57) ABSTRACT

A method and apparatus for carrying out a drive belt slippage regulation in a continuously variable transmission. A driving disk set and a driven disk set are connected together for torque transfer by an endless torque-transmitting element in which a power ratio between the driving disk set and the driven disk set of a variable speed drive is set as a function of a safety margin value.

17 Claims, 2 Drawing Sheets

METHOD AND APPARATUS FOR PERFORMING A SLIPPAGE REGULATION IN A CONTINUOUSLY VARIABLE TRANSMISSION

CROSS-REFERENCE TO RELATED APPLICATION

This is a continuation of International Application Ser. No. PCT/DE2003/002913, with an international filing date of Sep. 3, 2003, and designating the United States, the entire contents of which is hereby incorporated by reference to the same extent as if fully rewritten.

BACKGROUND OF THE INVENTION

1. Field of the Invention

The present invention relates to a method and an apparatus for performing slippage control in a continuously variable transmission, particularly an endless belt transmission having a driving disk set and a driven disk set that are coupled to one another by an endless belt means for transmitting torque.

2. Description of the Related Art

Continuously variable transmissions such as, for example, endless belt transmissions, are known in automotive technology, and usually have a driving disk set and a driven disk set that are coupled to one another by means of an endless belt for transmitting torque. If the contact pressure on the disk sets is freely adjustable, it is helpful for the transmission ratio control in an endless belt transmission if the precise course of the power ratio as a function of a margin of safety or a safety factor is known. In certain driving situations, for example in the case of wheel-side impacts or the like, it is necessary for the safety factor to be increased. That cannot be taken into account in the transmission ratio control in the known endless belt transmissions, so that the effects of the changed power ratios on the transmission ratio of the variable speed drive cannot be reduced or eliminated. For that reason comfort in the motor vehicle can be detrimentally affected.

The object of the invention is to propose a method and an apparatus for further optimizing the transmission ratio control in a continuously variable transmission.

SUMMARY OF THE INVENTION

That object can be procedurally achieved by a method for performing a slippage regulation in a continuously variable transmission, particularly an endless belt transmission, in which a driving disk set and a driven disk set that are coupled to one another by an endless belt means for transmitting torque, in which the power ratio (zeta) between the driving disk set and the driven disk set of a variable speed drive is learned as a function of the margin of safety. In that way an adaptation of the power ratio between the driving and driven disk sets of a variable speed drive as a function of the safety criteria (margin of safety) in a motor vehicle can be realized. Thereby the transmission ratio control, particularly in continuously variable transmissions, can be improved substantially.

The margin of safety is thereby designated as the power ratio at a current operating point between the actual contact force and the force at which a slippage of the belt means occurs. If, for example, the margin of safety assumes the value 1.0 it means that the slippage point of the belt means has been reached.

It is possible to determine the slippage point in advance. That can result, for example, by means of a superposition of an oscillation of the contact pressure and a cross-correlation between the rotational speeds of the disk sets, or the like. In the method in accordance with the invention, a reduction of the margin of safety begins at a very high contact pressure safety margin when the slippage point is known. That can be carried out until the slippage point is reached, or also until the instant shortly before the slippage point. That mode of operation can preferably be realized through a reduction of the contact pressure, for example, on the driven disk set. The transmission ratio control can thereby remain active at the same time, for example, and the change in the power ratios or the zeta value can be adjusted by a corresponding control of the disk set pressures.

The zeta value or the power ratio between the driving disk set and the driven disk set can be determined or calculated by knowledge of the rotational speed, the transmission ratio, and the disk set pressures or the control variables for the disk sets. The corresponding zeta values can preferably be saved as a function of the safety margin. The power ratio can then be preliminarily controlled in an advantageous way to always make possible an optimal contact pressure with a sufficient safety margin.

Within the scope of a further development of the invention, it can be provided that the method is preferably carried out at quasi-static operating conditions with constant safety margin and/or with an intentional slow reduction in safety margin. Those operating conditions preferably are usually within the overdrive range (OD) during constant speeds. Because the required pressure is a function of the input torque, and consequently upon the engine torque, the engine torque should not be too high, in order to operate within the greatest possible safety margin range. A range of between 50 and 100 Nm is preferably utilized. However, other ranges and operating conditions are also possible.

According to a further arrangement, the adaptation pursuant to the invention need not be carried out continuously. It is also possible to operate it in stages or the like. Consequently, a transmission ratio point in the transmission can be successively carried out, for example, with different safety margins. The values of the power ratio (zeta) determined at the respective operating points can be stored in a corresponding memory table or the like, and/or can also be utilized in a parametric model. By means of that adaptation an individual adjustment of the transmission ratio regulation to the respective transmission is possible.

It is also conceivable in the proposed method to store or save the zeta value as a function of the safety margin and the transmission ratio for adjustment. In that way a characteristic field can then be adjusted instead of a characteristic line.

According to an advantageous further arrangement, a suitable estimation of the pressures in the disk sets can also be carried out. It is necessary to know all the power components in order to calculate the zeta value. Aside from the spring forces, forces are also taken into consideration that are calculated based on the static and dynamic pressures. It is particularly advantageous if those pressures are known. In the method in accordance with the invention it is, however, not absolutely necessary to know those static pressures, because respective assumptions about average characteristic lines of the hydraulic valves are sufficient. Because the control current of the hydraulic valves is known, a theoretical pressure value can be calculated from that value. The error between an approximate and the actual valve characteristic line can be compensated for by preferably utilizing those approximate valve characteristic lines in the control of the disk sets. Thereby a variation can be compensated for in the simplest way.

Within the scope of a further arrangement of the present invention, it can be provided that in the method in accordance with the invention a maximum zeta is calculated, preferably during the operation of the motor vehicle. For a fixed contact pressure on the driven disk set the input torque can be increased in such a way that it causes a slippage of the belt means of the transmission.

It is also possible to keep the input torque constant and thereby the contact pressure is reduced. The power ratio (zeta) increases thereby at first and decreases then again before slippage of the belt means (slippage point). The interval from the maximum value of zeta to the slippage point lies at about 10%-30% as a function of the transmission ratio. That interval, as a rule, is independent of the contact pressure.

It has been shown that an operation that lies within the left range of the maximum zeta is particularly advantageous for the transmission. It is possible during operation, for example, to plot or store the characteristics of the power ratios during a reduction of the contact pressure. If it is determined that the maximum zeta has shifted to a defined contact pressure, the actual pressure requirement has changed.

Corresponding corrections of the operating parameters can be carried out with the known maximum values of zeta in order to ensure that the contact pressure is realized in the desired operating ranges (left from maximum value of zeta).

Preferably, with the method in accordance with the invention the operating parameters of the maximum values of zeta, for example, the safety margin and/or the transmission ratio, can be saved.

By means of the proposed correction of the control parameters, particularly the driveability or the driving comfort are improved substantially in vehicles having continuously variable transmissions. Further, disruptive influences can also be considerably reduced by the zeta value. Moreover, with the method in accordance with the invention a monitoring of the actual contact pressure requirement is realized.

Furthermore, the underlying object of the invention can also be achieved by an apparatus for carrying out a slippage regulation in a continuously variable transmission, in particular an endless belt transmission, in which a driving disk set and a driven disk set are coupled to one another by an endless belt means for torque transmission, especially for carrying out the proposed method, in which a device is provided for learning a power ratio (zeta) between the driving disk set and the driven disk set of a variable speed drive as a function of a safety value.

BRIEF DESCRIPTION OF THE DRAWINGS

Further advantages and advantageous arrangements result from the dependent claims and the following described drawings in which:

DESCRIPTION OF THE PREFERRED EMBODIMENTS

Figure 1:
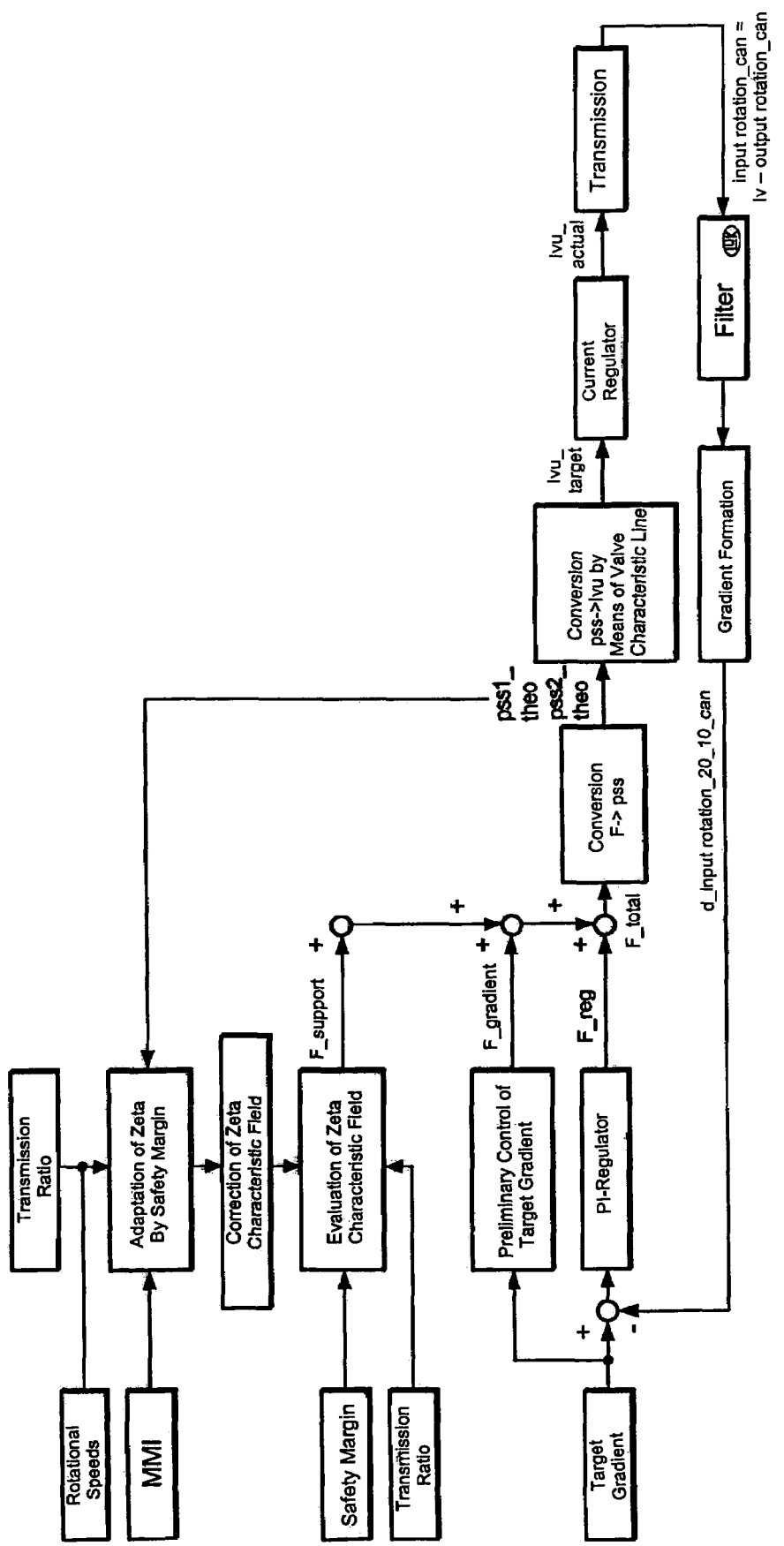
FIG. 1 is a flow diagram of a possible arrangement of the invention.

A suitable method to provide an estimate of the pressures in the disk sets is represented in FIG. 1 in the form of a flow diagram. For the calculation of the zeta value, knowledge of all the force components is necessary. In addition to the spring forces, forces that are calculated from the static and dynamic pressures are also taken into consideration.

In the proposed estimate, respective assumptions about average characteristic lines of the hydraulic valves are utilized. Since the control current of the hydraulic valves is known, a theoretical pressure value can be calculated from that value. The error between the approximated and the actual valve characteristic line is compensated by utilizing those approximated valve characteristic lines for controlling the disk sets.

Figure 2:
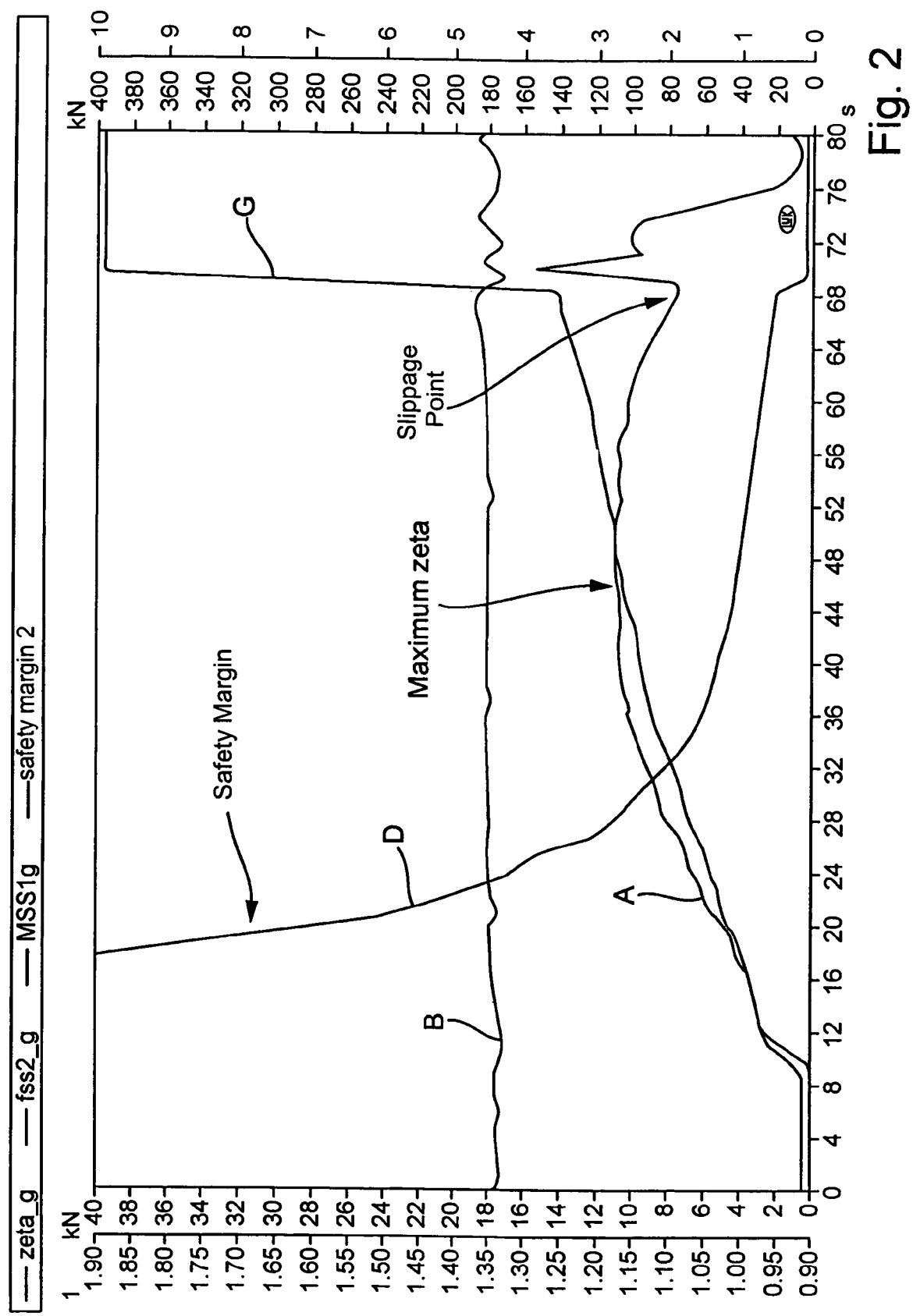
FIG. 2 is a graph with the representation of the maximum zeta measurement.

In FIG. 2 the characteristics of zeta (A), the contact pressure (B) on the driven disk set, the initial motor torque (C), and the safety margin (D) are represented.

In the determination of the maximum zeta value in accordance with the invention, the input torque for an almost constant contact pressure on the driven disk set can be increased in such a way that it approaches a slippage of the belt means of the transmission. After the maximum zeta, the slippage point becomes apparent on the basis of a reduction of the zeta value. Overall a particularly advantageous operation results for the continuously variable transmission when values are utilized that lie before the maximum zeta.

What is claimed is:

1. A method for performing a slippage regulation in a continuously variable transmission having a driving disk set and a driven disk set that are coupled to one another by a belt means for transmitting torque, said method comprising the steps of: detecting an input power level applied to the driving disk set and an output power level delivered by the driven disk set operatively coupled to the driving disk set; and determining a power ratio (zeta) between the driving disk set power level and the driven disk set power level of a variable speed drive as a function of a safety margin value, wherein at an actual operating point the ratio of the actual contact force and the contact force at which a slippage of the belt means relative to the disk set occurs is utilized as the safety margin value, and wherein the power ratio determination is carried out during quasi-static operating conditions of the transmission.

2. A method in accordance with claim 1, including the step of reducing the contact pressure at a known slippage point on the driven disk set until shortly before the belt means reaches the slippage point.

3. A method in accordance with claim 2, wherein a transmission ratio control at the variable speed drive remains active during the reduction of the contact pressure, and a change of the contact pressure is adjusted by a corresponding control of the contact pressure on at least one of said disk set.

4. A method in accordance with claim 1, including the step of storing the power ratio as a function of the safety margin.

5. A method in accordance with claim 1, including the step of utilizing an operating condition in the overdrive range (OD) during constant driving as the quasi-static operating condition.

6. A method in accordance with claim 1, wherein the power ratio (zeta) is adapted in stages.

7. A method in accordance with claim 1, wherein a transmission ratio condition of the variable speed drive is driven with different successive timewise values of the power ratio.

8. A method in accordance with claim 7, wherein the values of the power ratio (zeta) determined with regard to the respective operating conditions are utilized in a parametric model.

9. A method in accordance with claim 7, wherein the values of the power ratio (zeta) determined with regard to the respective operating conditions are stored.

10. A method in accordance with claim 1, wherein the power ratio (zeta) is saved as a function of the safety margin and the transmission ratio of the variable speed drive.

11. A method in accordance with claim 1, including the step of estimating the pressure in the two disk sets by calculating a theoretical pressure value from known control currents of hydraulic valves operatively associated with the disk sets.

12. A method in accordance with claim 1, including the step of calculating a maximum of the power ratio (zeta) during moving operation of the motor vehicle.

13. A method in accordance with claim 12, wherein at a predetermined contact pressure on the driven disk set an input engine torque is increased so that a slippage of the belt means of the transmission is approached.

14. A method in accordance with claim 12, wherein the input engine torque is kept constant and the contact pressure is reduced.

15. A method in accordance with claim 12, wherein the operating parameters of the transmission are corrected with the learned maximum zeta values to ensure an optimum contact pressure.

16. A method in accordance with claim 1, wherein the power ratio determination is carried out at an input torque range of from about 50 Nm to about 100 Nm.

17. Apparatus for performing a slippage regulation in a continuously variable transmission, in which a driving disk set and a driven disk set are coupled to one another by a belt means for transmitting torque, said apparatus comprising: means for detecting an input power level applied to the driving disk set and an output power level delivered by the driven disk set operatively coupled to the, driving disk set; and means for determining a power ratio (zeta) between the driving disk set power level and the driven disk set power level of a variable speed drive as a function of a safety margin value, wherein at an actual operating point the ratio of the actual contact force and the contact force at which a slippage of the belt means relative to one of the disk sets occurs is utilized as the safety margin value, and wherein the power ratio determination is carried out during quasi-static operating conditions of the transmission.

* * * * *